US006806461B2

(12) United States Patent
Strasser

(10) Patent No.: US 6,806,461 B2
(45) Date of Patent: Oct. 19, 2004

(54) POSITION MEASURING DEVICE AND METHOD FOR OPERATION OF A POSITION MEASURING DEVICE

(75) Inventor: Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 205 days.

(21) Appl. No.: 09/785,800

(22) Filed: Feb. 16, 2001

(65) Prior Publication Data

US 2001/0030283 A1 Oct. 18, 2001

(30) Foreign Application Priority Data

Feb. 17, 2000 (DE) .......................................... 100 07 225
Nov. 9, 2000 (DE) .......................................... 100 55 488

(51) Int. Cl.$^7$ ............................................. G01D 5/249
(52) U.S. Cl. .............................. 250/231.16; 250/231.18
(58) Field of Search ....................... 250/231.16, 231.18, 250/231.13, 231.14, 231.15, 231.17, 206.1, 234; 33/706, 707; 702/163, 40, 159, 94

(56) References Cited

U.S. PATENT DOCUMENTS

| | | | |
|---|---|---|---|
| 4,156,137 A | | 5/1979 | Nelle |
| 4,225,931 A | * | 9/1980 | Schwefel ..................... 702/150 |
| 4,360,730 A | | 11/1982 | Breslow |
| 4,593,194 A | * | 6/1986 | Graham et al. ........ 250/231.16 |
| 4,618,940 A | * | 10/1986 | Schmitt ........................ 702/94 |
| 4,628,201 A | | 12/1986 | Schmitt |
| 4,990,767 A | | 2/1991 | Ernst et al. |
| 5,216,626 A | | 6/1993 | Kranitzky |
| 5,302,944 A | * | 4/1994 | Curtis ........................ 340/653 |
| 5,627,466 A | | 5/1997 | Spies et al. |
| 5,687,103 A | | 11/1997 | Hagl et al. |
| 5,963,330 A | | 10/1999 | Braasch et al. |
| 5,973,620 A | | 10/1999 | Holzapfel et al. |
| 6,002,126 A | | 12/1999 | Feichtinger |
| 6,018,881 A | | 2/2000 | Spies |
| 6,111,402 A | | 8/2000 | Fischer |

FOREIGN PATENT DOCUMENTS

| | | |
|---|---|---|
| DE | 196 45 605 | 5/1998 |
| DE | 197 44 938 | 6/1998 |
| DE | 197 51 853 | 6/1998 |
| DE | 198 36 003 | 2/2000 |
| EP | 0 660 209 | 6/1995 |
| EP | 0 836 080 | 4/1998 |
| EP | 0 849 566 | 6/1998 |
| JP | 2-36313 | 2/1990 |
| WO | WO 00/08418 | 2/2000 |

OTHER PUBLICATIONS

Pending patent application Assigned to Dr. Johannes Heidenhain GmbH: Ser. No.: 09/506,752, Filing Date: Feb. 18, 2000, Inventor: Feichtinger.
Pending patent application Assigned to Dr. Johannes Heidenhain GmbH: Ser. No.: 09/762,754, Filing Date: Apr. 16, 2001, Inventor: Schroter et al.
Patent Abstracts of Japan, vol. 14, No. 191 (P–1038), Apr. 18, 1990, regarding Japanese publication 2–36313, published on Feb. 6, 1990, pp. 83–88.

* cited by examiner

Primary Examiner—David V. Bruce
Assistant Examiner—Hoon Song
(74) Attorney, Agent, or Firm—Brinks Hofer Gilson & Lione

(57) ABSTRACT

A position measuring device for generating position-dependent output signals that includes a scanning element by which a scanning plane is defined and a measuring graduation movable relative to the scanning element and defining a measuring graduation plane. The position measuring device further includes a regulating device for regulating output signals to constant signal amplitudes, in that the regulating device acts upon a predetermined controlling variable, to which end the requisite value of the controlling variable for the purpose of regulating is ascertained continuously by the regulating device.

30 Claims, 1 Drawing Sheet

POSITION MEASURING DEVICE AND METHOD FOR OPERATION OF A POSITION MEASURING DEVICE

Applicant claims, under 35 U.S.C. § 119, the benefit of priority of the filing date of Feb. 17, 2000 of a German patent application, copy attached, Serial Number 100 07 225.9, filed on the aforementioned date, the entire contents of which is incorporated herein by reference. Applicant also claims, under 35 U.S.C. § 119, the benefit of priority of the filing date of Nov. 9, 2000 of a German patent application, copy attached, Serial Number 100 55 488.1, filed on the aforementioned date, the entire contents of which is incorporated herein by reference.

BACKGROUND OF THE INVENTION

1. Field of the Invention

The present invention relates to a position measuring device and to a method for operating a position measuring device.

2. Discussion of Related Art

Known position measuring devices typically include a measuring graduation in a measuring graduation plane as well as a scanning unit movable relative to the measuring graduation. In the scanning unit, the scanning elements by way of which—as a function of the physical scanning principle—position-dependent output signals are generated are disposed in a scanning plane. The spacing between the measuring graduation plane and the scanning plane will be called the scanning spacing hereinafter. The relative motion between the aforementioned planes or the measuring graduation and the scanning unit can be either linear or rotational as well.

As examples for such position measuring devices, known photoelectric or inductive, incremental position measuring devices can be mentioned, of the kind used in numerically controlled machine tools. In photoelectric position measurement systems, typically various optoelectronic components are disposed in the scanning plane and serve to generate displacement-dependently modulated output signals; these include the light source used and suitable photodetectors. In the case of inductive position measuring devices, planar transmission and/or reception coils, for instance, are disposed in the scanning plane. With regard to inductive position measuring devices, German Patent Disclosure DE 197 51 853 A1 of the present applicant can be referred to. German Patent Disclosure DE 197 51 853 A1 corresponds to U.S. Pat. No. 6,111,402, the entire contents of which are incorporated herein by reference.

One important variable in such position measuring devices is the applicable scanning spacing, which must be set as precisely as possible in the assembly process. This is necessary in order to assure adequately high signal amplitudes for the output signals generated during the measurement operation. The most precise possible setting of the scanning spacing upon assembly is necessary especially in systems that are fully assembled not by the manufacturer but only later by the customer. Typically, such position measuring devices in the case of linear systems are called exposed measurement systems; in the case of rotational systems, they are called modular rotary encoders for integration.

For setting the most optimal possible scanning spacing, many mechanical aids in calibration have already been proposed. A disadvantage of these various aids in calibration that can be named is that they are each suitable only for certain constructions of such a position measuring device and accordingly cannot be employed universally.

Along with a suitable scanning spacing, further variables are significant for optimal functional status during the operation of position measuring devices; these variables too must be optimized as well as possible when operation begins.

OBJECT AND SUMMARY OF THE INVENTION

An object of the present invention is therefore to disclose a method which can be employed as universally as possible for operating a position measuring device, as well as a suitable position measuring device, which make precise setting of an optimal functional state of the position measuring device possible.

The above object is attained by a method for operation of a position measuring device, which comprises a scanning unit that defines a scanning plane and a measuring graduation that defines a measuring graduation plane, the scanning unit and the measuring graduation are movable relative to one another during a measurement operation, and position-dependent output signals are generated during scanning performed by the scanning unit. The method includes regulating the position dependent output signals to constant signal amplitudes by action on a controlling variable, ascertaining the value of the controlling variable required for the regulating and displaying the value of the controlling variable.

The above object is also attained by a position measuring device for generating position-dependent output signals that includes a scanning element by which a scanning plane is defined and a measuring graduation movable relative to the scanning element and defining a measuring graduation plane. The position measuring device further includes a regulating device for regulating output signals to constant signal amplitudes, in that the regulating device acts upon a predetermined controlling variable, to which end the requisite value of the controlling variable for the purpose of regulating is ascertained continuously by the regulating device.

Both the method and the position measuring device according to the present invention offer a number of advantages in comparison to versions of the prior art.

For instance, the method of the present invention is no longer tied to special mechanical constructions of the applicable position measuring device; instead, it can be employed universally with the most various types of such position measuring devices.

In installation situations that for instance do not permit visual checking of the set scanning spacing, the method of the present invention offers the user reliable information about the currently set scanning spacing. Via suitable calibration elements, the user need then merely set the scanning spacing, predetermined by the manufacturer, in a defined way.

The method of the present invention proves especially advantageous if a regulating device for regulating the output signals to constant signal amplitudes is already provided in the applicable position measuring device. For displaying the current scanning spacing at the time of assembly, then only the value of the controlling variable determined on a continuous basis by the regulating device requires further processing.

The method according to the present invention can furthermore be used in both linear and rotational position measuring devices. The method of the present invention can also be realized in conjunction with position measuring devices that are based on different physical scanning principles. Analogously, it is understood that it is possible to embody the most various position measuring devices in a manner according to the present invention.

Not only the scanning spacing but furthermore the entire functional status of the position measuring device can also be optimized according to the present invention.

Further advantages as well as details of the present invention will become apparent from the ensuing description of an exemplary embodiment in conjunction with the accompanying drawing.

DETAILED DESCRIPTION OF THE PREFERRED EMBODIMENTS

Figure 1:
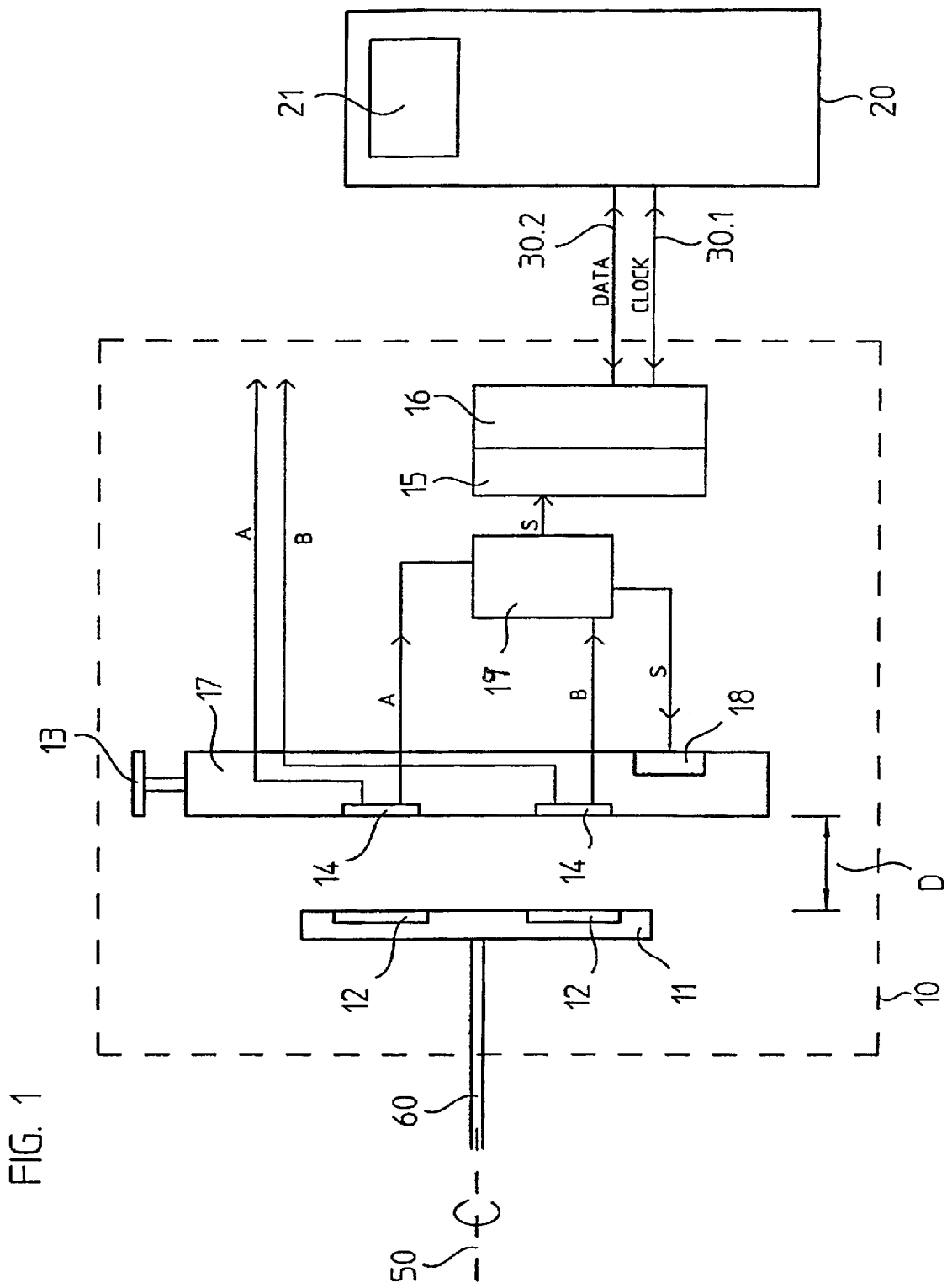
FIG. 1 shows a schematic block circuit diagram of an embodiment of a position measuring device according to the present invention.

Reference numeral 10 in the sole drawing indicates the position measuring device, of which only components whose function is important to an explanation of the present invention are shown schematically. An inductive rotational position measuring device 10 will be described in conjunction with the example shown; it is understood, however, that the present invention can be used in conjunction with linear position measuring devices as well, and in position measuring devices based on other physical scanning principles.

The position measuring device 10 of the exemplary embodiment described is used for determining the relative position of two parts rotating relative to one another, for instance to determine the position of a rotating shaft 60 of a motor—the motor itself not being shown.

The position measuring device 10 includes a measuring graduation 12, which is disposed on a graduation support carrier 11, which in turn is connected to the shaft 60 and is rotatable about the axis 50. The location of the rotating measuring graduation 12 in space defines a measuring graduation plane. A scanning unit 17 is disposed in stationary fashion at the scanning spacing D relative to the measuring graduation 12 or the measuring graduation plane. The scanning unit includes, among others, one or more exciter elements 18 and scanning elements 14, which in scanning the rotating measuring graduation 12 generate position-dependent output signals A, B. In the present case, a pair of incremental signals in phase quadrature is generated as the output signals A, B, which are further processed by an electronic evaluation unit 20. The electronic evaluation unit 20 can for instance be a numerical machine tool controller.

In the view shown in FIG. 1, in conjunction with the transmission of the signals A, B generated via the position measuring device 10 to the electronic evaluation unit 20, a synchronous serial transmission option is also indicated, by way of a corresponding interface and the two signal transmission lines in the form of a data line 30.2 and a clock line 30.1. In principle, however, transmission of the generated analog output signals A, B of the position measuring device 10 to the electronic evaluation unit 20 can also be provided parallel to this. It is also understood that an asynchronous data transmission between the position measuring device 10 and the electronic evaluation unit 20 can be employed, and so forth.

The measuring graduation 12 used, in this embodiment of the position measuring device 10 according to the present invention, includes a periodic sequence of regions of different electrical conductivity. The exciter elements 18, also shown only schematically in the drawing, are embodied as planar exciter coils; the scanning elements 14 are embodied as planar sensor coils.

In conjunction with the concrete embodiment of the measuring graduation 12 and the scanning unit 17 of this kind of inductive position measuring device 10, reference is made at this point to German Patent Disclosure DE 197 51 853 A1 of the present applicant, which corresponds to U.S. Pat. No. 6,111,402, the entire contents of which are incorporated herein by reference. However, in principle, as already indicated, the present invention is limited neither to the embodiment, shown in this reference, of an inductive position measuring device nor to that particular physical scanning principle. For instance, an optical or photoelectric position measuring device could also be used within the scope of this invention. The measuring graduation 12 would then be embodied for instance as a typical incident-light measuring graduation with regions of different reflectivity, a light source would function as the exciter element, and known optoelectronic detector elements would be provided as the scanning elements, and so forth.

The position measuring device 10 according to the present invention further includes one or more calibration elements for setting the scanning spacing D; of these, one, identified by reference numeral 13, is schematically indicated in the drawing. Suitable calibration elements 13 can be embodied in the manifold forms; in this connection, reference may be made for instance to German Patent Application DE 198 36 003 of the present applicant, which discloses a suitable calibration variant, and a positioning device suitable for the calibration. German patent application DE 198 36 003 corresponds to U.S. patent application Ser. No. 09/762,754, entitled "Method for Assembling a Position Measuring Device and a Position Means for the Assembly" and filed Feb. 8, 2001, the entire contents of which are incorporated herein by reference.

In the position measuring device 10 of the present invention, a regulating device 19 is also provided, to which the output signals A, B of the scanning elements 14 are delivered. Furthermore, the position measuring device 10 includes a conversion device 15 and a transmission device 16, which as already indicated is embodied as a synchronous serial interface. The data transfer between the position measuring device 10 and the electronic evaluation unit 20 takes place via the transmission device 16 and the data line 30.2 as well as the clock line 30.1. With regard to the function of the various components, the ensuing description will be referred to.

In conjunction with a suitable transmission device or a suitable serial interface, at this point reference may be had to the interface sold under the name EnDAT sold by the present applicant, or to European Patent Disclosure EP 0 660 209 A1. European Patent Disclosure EP 0 660 209 A1 corresponds to U.S. Pat. No. 5,687,103, the entire contents of which are incorporated herein by reference.

With the aid of the schematic illustration in the drawing, the method of the present invention will now be described in further detail. The regulating device identified by reference numeral 19 is used to regulate the signal amplitudes of the output signals A, B to be constant signal amplitudes. Constant signal amplitudes of the analog, sine- wave or cosine-wave output signals A, B are required especially in further processing, in order to avoid incorrect measurements; otherwise, upon further signal subdivision or signal interpolation of the output signals A, B, possible mistakes in position determination will occur. However, in such a position measuring device, fluctuating signal amplitudes in measurement operation can be due to various causes. In magnetic or inductive position measuring devices, for instance, possibly with a varying scanning spacing D, undesirably fluctuating signal amplitudes result; in optical position measuring devices, conversely, deterioration of the measuring graduation can lead to an undesired collapse of the signal amplitude.

In principle, regulating devices 19 for regulating the output signals A, B to constant signal amplitudes are known for the most various position measuring devices. Typically in such regulating devices 19, the applicable signal amplitude is ascertained as an actual value and compared with a predetermined set-point amplitude value, and on the basis of the comparison a value of the controlling variable is determined, which is required in order to reregulate the actual value of the signal amplitude to the set-point amplitude value. In this connection, regulating devices are known in which the variable $R^2=A^2+B^2$ is formed from two phase-offset signals $A=_0*\sin(xt)$, $B=B_0*\cos(xt)$ of the position measuring device 10 by suitable wiring, and the variable $R^2$ is used as a current measure for the signal amplitude and thus as an actual value for the regulation. Thus, if there are no changes in the amplitudes $A_0$ and $B_0$, then the term $R^2$ will not change. If monitored changes in $R^2$ are detected, then the controlling variable is changed accordingly to maintain constant amplitudes.

Depending on the scanning principle of the position measuring device 10, action is exerted via the regulating device 19 on various controlling variable S, in order to vary the signal amplitude in terms of regulation. In the present case of an inductive position measuring device 10, the current supply of the transmission coils, as the controlling variable S, can be varied in a targeted way by the regulating device 19, which in the sole drawing is illustrated by the connection between the regulating device 19 and the exciter elements 18 or the transmission coils. Alternatively, it would also be possible for the gain of an amplifier element to be varied in a targeted way as the controlling variable; this element amplifies the analog output signals A, B that are generated via the scanning unit.

In optical position measuring devices, analogously to this, the luminosity of a light source, or in other words the light source current, is accordingly varied as the controlling variable S, and so forth.

In the present invention, the controlling variable S, which is required for regulating the output signals A, B to constant signal amplitudes, is now additionally used for setting the scanning spacing D as well. The additional usage of the controlling variable S for this purpose is based on the recognition that the applicable magnitude of the value of the controlling variable represents a direct measure for the current scanning spacing D. The scanning spacing D and the value of the controlling variable are proportional to one another within a certain range. For instance, in the case of a large scanning spacing D and relatively small signal amplitudes, the result is a large amount of the controlling variable S is required for reregulation to constant signal amplitudes. Conversely, if a small scanning spacing D is present, there is a correspondingly smaller amount of the controlling variable required for regulating the signal amplitudes, and so forth. Note that conversion of the value of the controlling variable to a scanning spacing D can be done either manually or automatically by the encoder as described below.

The value of the controlling variable S can also be used as a general measure for the current functional state of the position measuring device.

For both the manual and automatic cases discussed above where the conversion of the value of the controlling variable to a scanning spacing D, the functional relationship between the scanning spacing D and the value of the controlling variable, such as S, can be done by a calibration procedure before the encoder is used in a measuring mode. From the calibration procedure there results a calibration curve defining the relationship between the scanning spacing D and the value of the controlling variable. With the aid of the calibration curve it is possible to convert the controlling variable into the scanning spacing variable D that has to be adjusted.

If the above mentioned conversion is performed in the encoder, then the calibration curve is saved in an appropriate memory/look-up table. If the conversion is performed manually, the person performing the conversion must have the calibration curve available in an appropriate form.

According to a first embodiment of the invention, the value of the controlling variable required for the regulation is therefore ascertained continuously and converted into a digital signal suitable for serial transmission. To that end, the controlling variable S in the position measuring device 10 of the invention is also transmitted from the regulating device 19 to the schematically indicated conversion device 15.

The transmission device 16 already mentioned above, embodied for instance as a known synchronous serial interface, is also assigned to the conversion device 15. Finally, among other actions, the transmission of the suitably prepared value of the controlling variable to the downstream electronic evaluation unit 20 is also done via the transmission device 16 and the data line 30.2. The transmission of the value of the controlling variable is done within a defined transmission protocol; the applicable value of the controlling variable is transmitted with a predetermined bit width to the electronic evaluation unit 20. Besides the data line 30.2, which can be operated bidirectionally, the present exemplary embodiment also has a clock line 30.1 for synchronizing the data transfer between the transmission device 16 and the electronic evaluation unit 20.

The described manner of transmitting the value of the controlling variable to the electronic evaluation unit 20 here is not essential to the present invention; still other transmission variants are certainly feasible within the scope of the present invention, for instance in the context of asynchronous serial data transmission, and so forth.

In accordance with a second embodiment of the present invention, it is also conceivable for the ascertained value of the controlling variable already to be converted in the position measuring device 10 into a variable that for instance corresponds to the actual scanning spacing D, and for this variable then to be transmitted as the digital signal.

In the electronic evaluation unit 20, for instance a numerical machine tool controller, among other elements a display device 21 is provided, which is embodied for example as a conventional display. Along with the most manifold other information, the value of the controlling variable that has just been transmitted is also displayed on the display device 21. For assembly of the position measuring device according to the present invention, it is possible via the display device 21, for instance, to offer the user a suitable user surface, on which among other elements the information regarding the value of the controlling variable or the scanning spacing D is displayed.

The applicable user can then set the scanning spacing D, on the basis of the displayed value of the controlling variable, with the aid of the calibration elements 13 upon installation of the position measuring device 10.

Advantageously, certain guidelines regarding an ideal scanning spacing D will be specified to the user by the applicable manufacturer of the position measuring device. In particular, in this respect, it may be provided for instance that a certain installation tolerance range for the magnitude of the scanning spacing D can be predetermined, within which range installation must be done. To assure that in the actual measurement operation the complete system will not already fail if this tolerance range is exceeded, it proves to be favorable if the predetermined limit values of the installation tolerance range are already selected in a way that deviates markedly from the limits of the functionality range. For instance, in the case of a functionality range of D=[0.2 mm; 0.8 mm], i.e., 0.2 mm≦D≦0.8 mm, it would be conceivable to predetermine an installation tolerance range of D=[0.45 mm; 0.55 mm], i.e., 0.45 mm≦D≦0.55 mm.

The transmitted value of the controlling variable can be displayed in the most various ways on the display device 21 for the sake of supporting the user, or brought to his attention in some other way. For instance, it is possible for the value of the controlling variable to be displayed directly as an alphanumeric variable. It can also be provided that the value of the controlling variable is converted into a variable that directly corresponds to the actual scanning spacing. Finally, however, it is also possible for the value of the controlling variable to be displayed in graphic form, for instance in the form of a suitable bar graph, and so forth. In that case, the manufacturer of the position measuring device should then specify the limit values of an installation tolerance range to suit the selected display of the value of the controlling variable.

Furthermore, as already indicated, the displayed value of the controlling variable S can be evaluated as a general measure for the functional state of the position measuring device.

A number of possible embodiments, which can be realized in accordance with requirements, thus exist within the scope of the present invention.

The foregoing description is provided to illustrate the invention, and is not to be construed as a limitation. Numerous additions, substitutions and other changes can be made to the invention without departing from its scope as set forth in the appended claims.

What is claimed is:

1. A method for operation of a position measuring device, which comprises a scanning unit that defines a scanning plane and a measuring graduation that defines a measuring graduation plane, said scanning unit and said measuring graduation are movable relative to one another during a measurement operation, and position-dependent output signals are generated during scanning performed by said scanning unit, said method comprising:

regulating said position-dependent output signals to constant signal amplitudes by action on a controlling variable;

ascertaining a value of said controlling variable required for said regulating;

converting said value of said controlling variable into a digital signal suitable for serial transmission;

transmitting said digital signal in a defined serial transmission protocol to an electronic evaluation unit downstream of said position measuring device via a transmission device;

displaying said converted value of said controlling variable; and setting a scanning spacing between said scanning plane and said measuring graduation plane with the aid of said displayed value of said controlling variable, which acts as a measure for a current scanning spacing for setting a predetermined, optimal scanning spacing.

2. The method of claim 1, wherein said regulating said position-dependent output signals to a constant signal amplitude comprises varying a current supply of a transmission coil as a function of said controlling variable.

3. The method of claim 1, wherein said regulating said position-dependent output signals to a constant signal amplitude comprises varying a gain of an amplifier element as a function of said controlling variable.

4. The method of claim 1, wherein said regulating said position-dependent output signals to a constant signal amplitude comprises varying a luminosity of a light source as a function of said controlling variable.

5. The method of claim 1, further comprising transmitting said digital signal in a serial protocol at a predetermined bit width to said electronic evaluation unit.

6. The method of claim 1, further comprising converting said transmitted value of said controlling variable into a variable that corresponds directly to said current scanning spacing.

7. The method of claim 1, wherein said displaying comprises having said value of said controlling variable displayed in a form of an alphanumeric variable.

8. The method of claim 1, wherein said displaying comprises having said value of said controlling variable displayed in graphic form.

9. The method of claim 1, wherein said setting is performed by a calibration element.

10. The method of claim 1, wherein said position-dependent output signals comprise a first periodic signal $A=A_0*\sin(xt)$ and a second periodic signal $B=B_0*\cos(xt)$, said method further comprising:

forming a variable $R^2=A^2+B^2$ which is representative of said value of said controlling variable used during said regulating.

11. A position measuring device for generating position-dependent output signals, comprising:

a scanning element by which a scanning plane is defined;

a measuring graduation movable relative to said scanning element and defining a measuring graduation plane;

a regulating device for regulating output signals to constant signal amplitudes, in that said regulating device acts upon a predetermined controlling variable, to which end a requisite value of said controlling variable for the purpose of regulating is ascertained continuously by said regulating device;

a conversion device for converting said value of said controlling variable into a digital signal suitable for serial transmission, wherein said conversion device is followed by a transmission device for transmitting said digital signal in a defined serial transmission protocol to an electronic evaluation unit; and a calibration element for setting a scanning spacing, which is defined as a spacing between said scanning plane and said measuring graduation plane.

12. The position measuring device of claim 11, wherein said transmission device is embodied as a synchronous serial interface.

13. The position measuring device of claim 11, further comprising a display device that displays said transmitted value of said controlling variable.

14. The position measuring device of claim 11, further comprising a transmission coil and a reception coil in said scanning plane.

15. The position measuring device of claim 14, wherein said regulating device varies a current supply of said transmission coil as a controlling variable.

16. The position measuring device of claim 11, wherein said regulating device varies an amplitude of an amplifier element as a function of said controlling variable.

17. The position measuring device of claim 11, further comprising a light source and a detector element.

18. The position measuring device of claim 17, wherein said regulating device varies a luminosity of said light source, to which end a current of said light source, as a controlling variable, can be varied.

19. A method for operation of a position measuring device, which comprises a scanning unit that defines a scanning plane and a measuring graduation that defines a measuring graduation plane, said scanning plane and said measuring graduation plane being separated by a scanning spacing, said scanning unit and said measuring graduation are movable relative to one another during a measurement operation, and position-dependent output signals are generated during scanning performed by said scanning unit, said method comprising:

regulating said position-dependent output signals to constant signal amplitudes by action on a controlling variable;

ascertaining a value of said controlling variable required for said regulating;

converting said controlling variable into a variable that directly corresponds to an actual scanning spacing;

displaying said value of said variable that directly corresponds to said actual scanning spacing; and setting a scanning spacing between said scanning plane and said measuring graduation plane with the aid of said displayed value of said variable that directly corresponds to said actual scanning spacing, which acts as a measure for a current scanning spacing for setting a predetermined, optimal scanning spacing.

20. The method of claim 19, further comprising:

converting said value of said controlling variable into a digital signal suitable for serial transmission; and transmitting said digital signal to an electronic evaluation unit downstream of said position measuring device.

21. The method of claim 20, further comprising transmitting said digital signal in a serial protocol at a predetermined bit width to said electronic evaluation unit.

22. The method of claim 20, wherein said setting is performed by a calibration element.

23. The method of claim 19, wherein said regulating said position-dependent output signals to a constant signal amplitude comprises varying a current supply of a transmission coil as a function of said controlling variable.

24. The method of claim 19, wherein said regulating said position-dependent output signals to a constant signal amplitude comprises varying a gain of an amplifier element as a function of said controlling variable.

25. The method of claim 19, wherein said regulating said position-dependent output signals to a constant signal amplitude comprises varying a luminosity of a light source as a function of said controlling variable.

26. The method of claim 19, wherein said displaying comprises having said value of said variable that directly corresponds to said actual scanning spacing displayed in a form of an alphanumeric variable.

27. The method of claim 19, wherein said displaying comprises having said value of said variable that directly corresponds to said actual scanning spacing displayed in graphic form.

28. The method of claim 19, wherein said position-dependent output signals comprise a first periodic signal $A=A_0*\sin(xt)$ and a second periodic signal $B=B_0*\cos(xt)$, said method further comprising:

forming a variable $R^2=A^2+A^2+B^2$ which is representative of said value of said controlling variable used during said regulating.

29. A method for operation of a position measuring device, which comprises a scanning unit that defines a scanning plane and a measuring graduation that defines a measuring graduation plane, said scanning unit and said measuring graduation are movable relative to one another during a measurement operation, and position-dependent output signals are generated during scanning performed by said scanning unit, said method comprising:

regulating said position-dependent output signals to constant signal amplitudes by action on a controlling variable;

ascertaining a value of said controlling variable required for said regulating;

converting said value of said controlling variable into a digital signal suitable for serial transmission;

transmitting said digital signal in a defined serial transmission protocol to an electronic evaluation unit downstream of said position measuring device via a transmission device, wherein said transmitted digital signal is transmitted with a predetermined bit width;

displaying said converted value of said controlling variable, wherein said displayed value of said converted controlling variable is evaluated as a general measure for a functional state of said position measuring device.

30. The position measuring device of claim 11, wherein said serial data transfer between said transmission device of said position measuring device and said evaluation unit takes place via a data line and a clock line.

* * * * *